United States Patent [19]
Alejandro Llera

[11] 4,436,212
[45] * Mar. 13, 1984

[54] TAMPER PROOF CLOSURE

[75] Inventor: Santos A. Alejandro Llera, San Juan, P.R.

[73] Assignee: Precision Plastic Products Corp.

[ * ] Notice: The portion of the term of this patent subsequent to Apr. 19, 2000 has been disclaimed.

[21] Appl. No.: 375,207

[22] Filed: May 5, 1982

Related U.S. Application Data

[63] Continuation-in-part of Ser. No. 185,889, Sep. 10, 1980, Pat. No. 4,380,299.

[51] Int. Cl.³ .............................................. B65D 49/12
[52] U.S. Cl. ..................................... 215/252; 215/258
[58] Field of Search ............................... 215/252, 258

[56] References Cited

U.S. PATENT DOCUMENTS

| | | | |
|---|---|---|---|
| 2,162,711 | 3/1936 | Hamberger | 215/7 |
| 3,032,226 | 12/1960 | Terwilliger | |
| 3,109,547 | 11/1963 | Wood | |
| 3,249,247 | 10/1964 | Babiol | 215/42 |
| 3,329,295 | 11/1965 | Fields | 215/10 |
| 3,407,976 | 5/1966 | Homma | 222/485 |
| 3,415,403 | 12/1966 | Bardell | 215/42 |
| 3,441,161 | 4/1969 | Van Baarn | |
| 3,504,818 | 11/1968 | Crisci | 215/42 |
| 3,650,428 | 3/1972 | Miller | 215/42 |
| 3,737,064 | 6/1973 | Somabhai | 215/42 |
| 3,784,041 | 1/1974 | Birch | 215/40 |
| 3,804,282 | 4/1974 | Komendowski | 215/32 |
| 3,837,519 | 9/1974 | Perry | 215/7 |
| 3,874,540 | 4/1975 | Hidding | 215/252 |
| 3,904,062 | 9/1975 | Grussen | 215/252 |
| 3,927,784 | 12/1975 | Cochrane | |
| 3,946,891 | 3/1976 | Picoy | |
| 3,955,696 | 5/1976 | Finke | 215/214 |
| 4,109,814 | 8/1978 | Rausing | |
| 4,109,816 | 8/1978 | Faulstich | |
| 4,157,144 | 6/1979 | Weiler et al. | 215/252 |
| 4,343,408 | 8/1982 | Csaszar | 215/258 |

FOREIGN PATENT DOCUMENTS

| | | |
|---|---|---|
| 1482594 | 7/1965 | Fed. Rep. of Germany . |
| 2349265 | 10/1973 | Fed. Rep. of Germany . |
| 1347895 | 11/1962 | France . |
| 1422230 | 11/1965 | France . |
| 1517037 | 2/1967 | France . |
| 1536459 | 7/1967 | France . |
| 92382 | 10/1968 | France . |
| 922181 | 3/1963 | United Kingdom . |
| 1073225 | 6/1967 | United Kingdom . |

*Primary Examiner*—George T. Hall
*Attorney, Agent, or Firm*—Kane, Dalsimer, Kane, Sullivan & Kurucz

[57] ABSTRACT

A tamper proof closure for threaded container for spirits or liquor having a retainer thereon, with said closure having a body with an internally threaded straight side wall and a breakaway skirt located thereon which is adapted to slide over the retainer on the container, the breakaway skirt being separated from the remainder of the side wall by a number of frangible straps.

21 Claims, 4 Drawing Figures

TAMPER PROOF CLOSURE

This is a continuation-in-part of my application Ser. No. 185,889, filed on Sept. 10, 1980, which was issued on Apr. 19, 1983 as U.S. Pat. No. 4,380,299, the disclosure of which is incorporated herein by reference.

FIELD OF THE INVENTION

The present invention relates to an improved tamper indicating closure.

BACKGROUND OF THE INVENTION

There presently exists numerous tamper indicating closures for containers, bottles, etc. These closures come in various materials for example, metals and plastics predominently. Metal closures however have the disadvantage of being expensive, and prone to leaving sharp edges which can cut the user's fingers.

The closures may be adapted to allow for a portion thereof to be left on the container after opening as an indicator. This is often accomplished by requiring the user to pull or strip from the closure a band which is typically situated between the threads of the closure and the portion remaining on the container to allow the unscrewing of the closure. Thus, two operations are required for removal of the closure in addition to the discarding of the band. In addition, experience has proven that the tamper proof evidence in the form of a detachable ring many times will not remain on the neck of the bottle.

Other types of closures provide for a breakaway portion which breaks from the closure during unscrewing thereby providing for a single operation. This type of closure may come in a single piece or a plurality of pieces. Many of these closures are made of inappropriate material, involve complicated design of the closure and/or contain or involve complex molding techniques, limiting their application.

Thus, it would be advantageous to have a simple but effective tamper proof closure which would indicate tampering once opened, inhibit reuse of the container for bogus material, yet be asthestically pleasing with straight walls and which can be used to re-seal a bottle. It would also be advantageous to have a closure which could be used on a bottle with a relatively simple neck thus reducing the cost of the manufacturing of the bottle.

Also in many applications a liner is unnecessary, in others such as in the case of carbonated beverages, food, and pharmaceutical products etc., a linear is required. It would therefore be advantageous if the closure is versatile enough to be applicable in both situations and if necessary, readily allow the use of a liner.

Furthermore, it would be advantageous to have a closure which can be affixed to the bottle in one simple operation, eliminating the need for tear bands etc.

SUMMARY OF THE INVENTION

Accordingly, it is an object of the invention to provide for a single piece tamper indicating closure suited for various types of containers which together with the neck finish is relatively simple in construction and operation, and which is asthetic in appearance being straight walled with a breakaway skirt or portion thereon which will remain on the container when the closure is removed so as to indicate tampering.

Another object is to provide for the breakaway portion to remain on the container so as to be difficult to pry or remove thus inhibiting the reuse of the bottles.

A yet another object of the invention is to provide for a tamper indicating closure which is readily moldable and removable from the core of the mold while allowing it to be made of a number of resins including those that are relatively rigid, and can be utilized on containers made of glass or plastic.

The tamper indicating closure of the invention may be made with or without a liner and is provided with a breakaway skirt that does not require special cams or lugs on the neck of the container. The neck is provided with a continuous chamfer retaining ring designed to retain the breakaway skirt of the closure, thereby providing pilfer evidence. The crown or dome of the closure is flat and the side wall is downwardly extending therefrom. A breakaway skirt is provided and coupled to the side wall via a frangible connection comprising a plurality of straps formed out of the side wall, between the top of the breakaway skirt and the side wall.

The inside wall of the breakaway skirt is provided with a continuous circumferentially extending wedge shaped ring which allows for its removal from the core of its mold and its turning down on the neck of the container without the fracturing of the frangible portion. When the closure is twisted off from the container, the breakaway skirt remains relatively fixed on the container to provide the consumer with pilfer evidence. The neck finish, in addition to being threaded, includes an outwardly projecting continuous ring below the threads and is provided with a retaining means having an upper face extending downwardly and outwardly relative to the axis of the neck with a bottom face normal thereto. The angling-down of the upper face allows the closure to be turned down onto the container without breaking the straps. Once the skirt ring passes over the upper face it abuts the bottom face and is positioned between this face and a neck ring therebetween below forming a channel of tight tolerances. When the closure is removed, the breakaway skirt is severed from the closure and tightly remains on the container between the face and ring so as to inhibit its removal and the subsequent reuse of the container.

BRIEF DESCRIPTION OF THE DRAWINGS

The above-mentioned as well as other features and objects of this invention will become more apparent in the following description taken in conjunction with the accompanying drawings in and.

DETAILED DESCRIPTION OF THE PREFERRED EMBODIMENT

Figure 1:
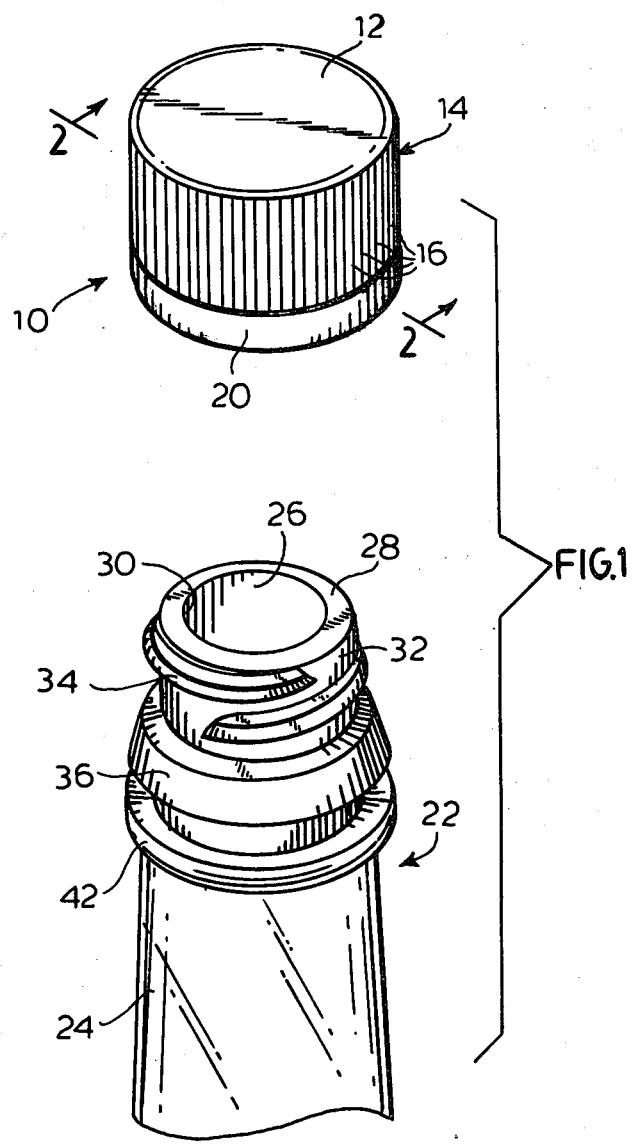
FIG. 1 is a perspective view of the closure and the neck of a container prior to placing the closure thereon incorporating the teachings of the invention.
Figure 2:
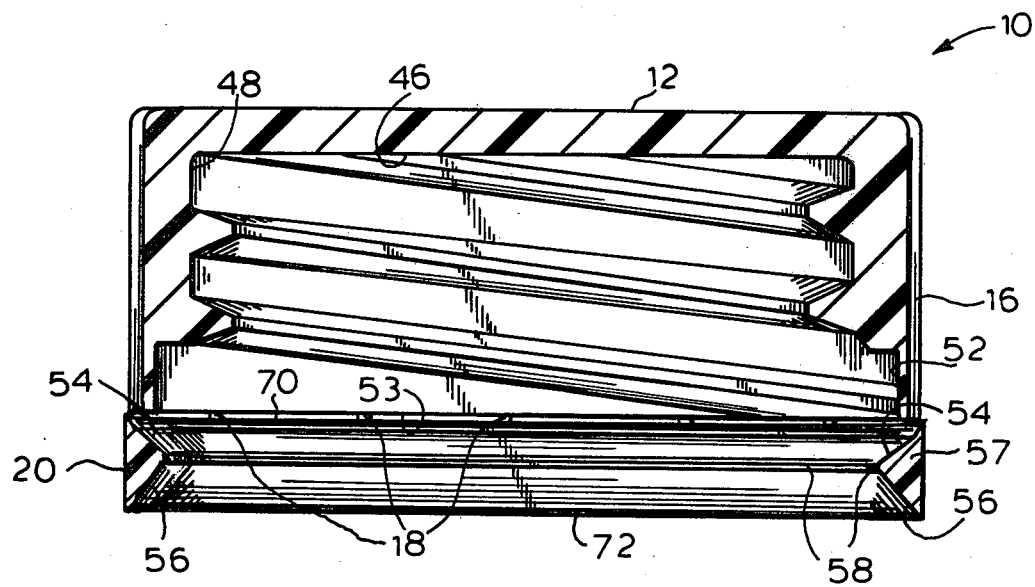
FIG. 2 is a sectional view of the closure incorporating the teachings of the invention.
Figures 2A, 2B:
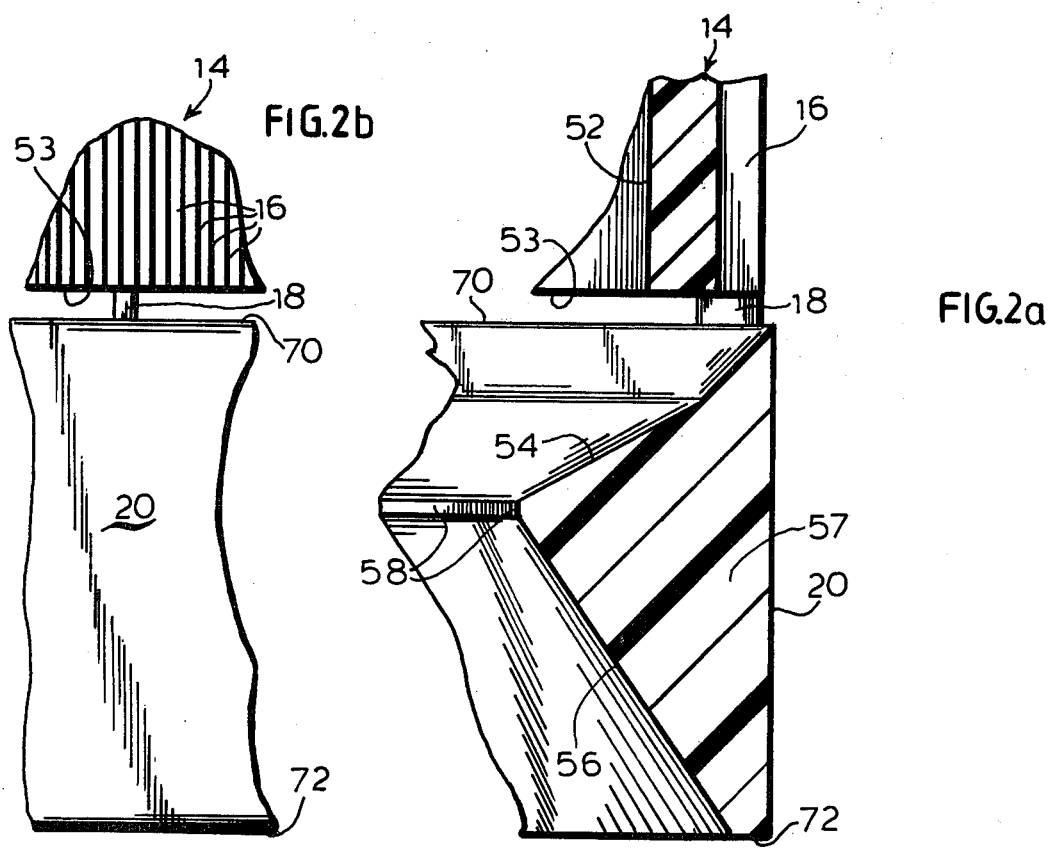
FIG. 2a is an enlarged sectional view of a portion of the breakaway skirt.
FIG. 2b is an enlarged prospective view of a portion of the frangible portion of the closure.

Referring now to the drawings, FIG. 1 shows the closure or cap 10 having a dome or crown 12 which is circular in form with a flat external surface. Extending downward from the crown is an annular wall 14 on which is located a plurality of outwardly tapered vertical ribs 16 with their bases on wall 14 which facilitate grasping the closure. Attached to this wall is a breakaway skirt 20, as will be later discussed.

The closure 10 is intended to be fitted on a portion or neck 24 of a container or bottle 22 which may be made of a variety of materials such as plastic resins, particularly that of polypropylene which has found to be well suited. Also, while a bottle is shown, it should be understood that it is used merely as an example. The present closure and its attendant features may be used in virtually any industry and may be incorporated on many different types of containers made of a variety of materials, i.e., glass, plastic, metal, etc. However, the closure is preferably suited to be used on a glass container, but not limited thereto.

The neck 24 is provided with an opening 26 to allow the ingress and egress of material. An end surface 28 is provided about the opening, and defined by the inner 30 and outer surface or neck finish 32 of the bottle. As can be readily seen, the neck finish is relatively simple in construction which would otherwise complicate its design and construction especially for glass bottles. Below surface 28 is a helical thread 34. A desirable pitch for this thread 28 is 8:1 rather than the normal 6:1 pitch, so as to facilitate the prevention of back-off the closure.

Figure 3:
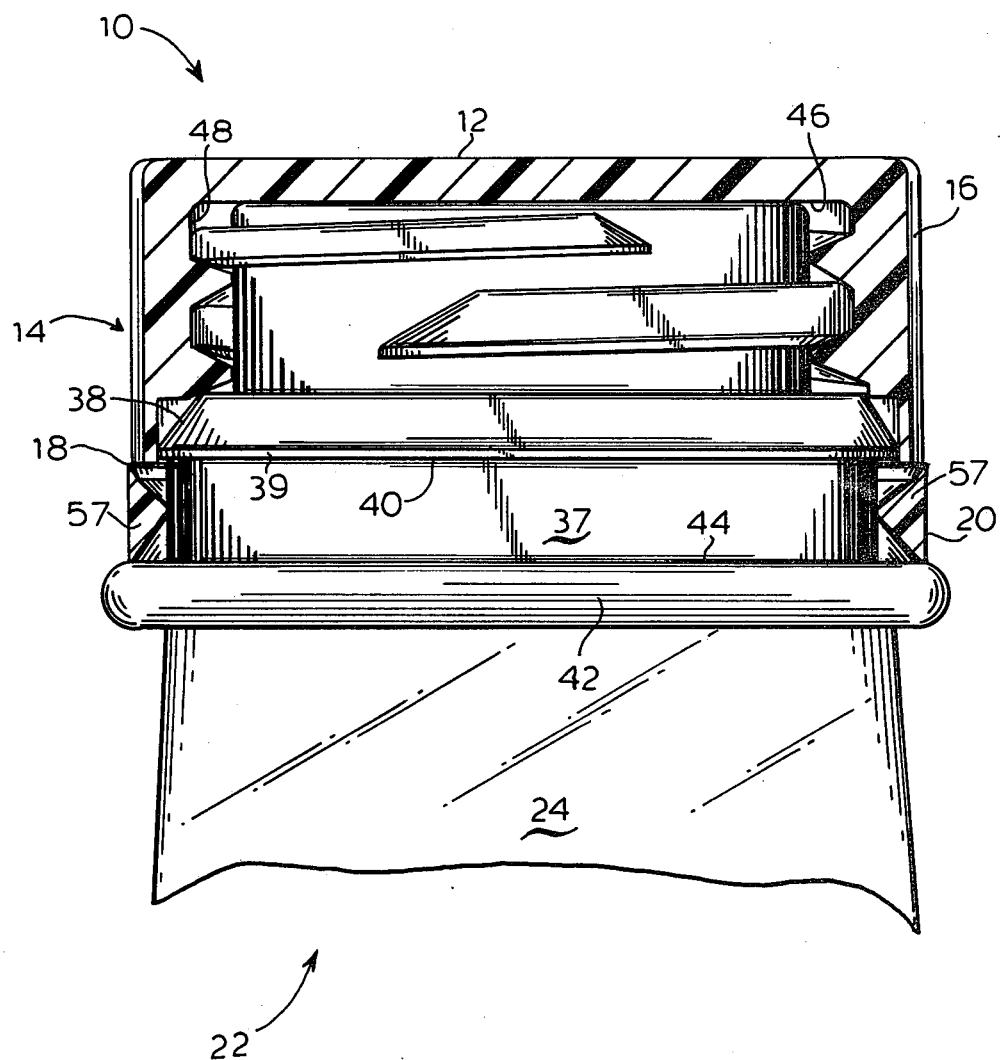
FIG. 3 is a sectional view of the closure on the neck of the container.

A retaining or chamfer ring 36 is provided about the circumference of the bottle below the thread 34 as can best be seen in FIGS. 3 and 4, and includes an upper face 38 extending angularly downward, terminating at lower surface 40, which is normal to said axis. Upper surface 38 and lower surface 40 define the maximum circumference of chamfer ring 36 as at 39.

Below ring 36 is a cylindrical surface 37, and a neck ring 42 about the circumference of the bottle having an upper surface 44 which faces bottom surface 40. The bottom surface 40, upper surface 44 and cylindrical surface 37 of the bottle serve to define a space in which the breakaway skirt 20 of the closure is somewhat fixedly retained on the bottle 22 as evidence of tampering, as can be seen most clearly once the closure 10 is threaded on the container in FIGS. 3 and 4. In this regard, somewhat close tolerances are provided between the breakaway skirt 20 and surface 44 and bottom surface 40 in addition to the size of ring 42, to assure that the tamper proof evidence remains on the bottle to inhibit its prying off, and subsequent reuse of the bottle for bogus material etc.

Turning now more particularly to the closure 10, there is provided a flat upper surface 46 of the dome 12 which, when turned down, engages the upper surface 28 of the bottle to seal the contents thereof. It should be noted that while a liner or sealant is not shown nor necessary in many applications, in applications where necessary it is readily includable between these surfaces by being axially placed in the closure 10.

Extending from the dome 12 is wall 14 having an internal surface 48 upon which is located a helical thread 50 which corresponds, in a mating like relationship, to the thread 34 on the bottle so as to allow the closure to be screwed on and off. Similarly, thread 50 would match 34 the thread on the bottle and preferably have an 8:1 pitch rather than the normal 6:1 so as to aid in the prevention of back-off, which may cause leaks.

Below thread 50 is a straight cylindrical portion 52 which continues to the bottom rim 53 of the wall. The breakaway skirt 20 has smooth outer surface 21, and two inner surfaces 54 formed in two angles and 56, which angles toward each to form a wedge shaped inner ring 57. Note that during the molding process the breakaway skirt may have a circumference slightly larger than that of the side wall 14. If this occurs, the closure will however straighten out when placed on the container.

Inner surface 54 and outer surface 21 form the top 70 of the skirt, while inner surface 56 and outer surface 21 form the bottom 72 of the skirt. The two inner surfaces meet at apex 58 which defines a circular opening which has a smaller circumference than the maximum circumference 39 of chamfer ring 36.

The skirt 20 is connected at the lower end of wall 14 by several horizontal straps or connectors 18, with the straps being affixed to inner surface 54 of the breakaway skirt 20, near top 70. These straps are arranged around the bottom portion of wall 14 and may be at equal arc length to each other with seven or eight in number, although not limited thereby. Note that the straps 18 may be formed out of a select number of vertical ribs 16 by undercutting outwardly through the sidewall 14 about its circumference. The straps 18 are formed in this regard by not undercutting all the way through at the desired intervals.

The closure 10 may be placed upon a bottle 22 by merely turning it down thereon. As this is being done, surface 56 contacts surface 38 and gradually causes the breakaway skirt 20 to expand outwardly to a point in which the apex 58 passes ring 36. This expansion is not sufficient to break the straps 18 between the wall and the breakaway skirt 20. Further turning causes apex 58 to pass beyond ring 36 with the surface 54 now positioned under and in an abutting relationship with surface 40 of chamfer ring 36.

Figure 4:
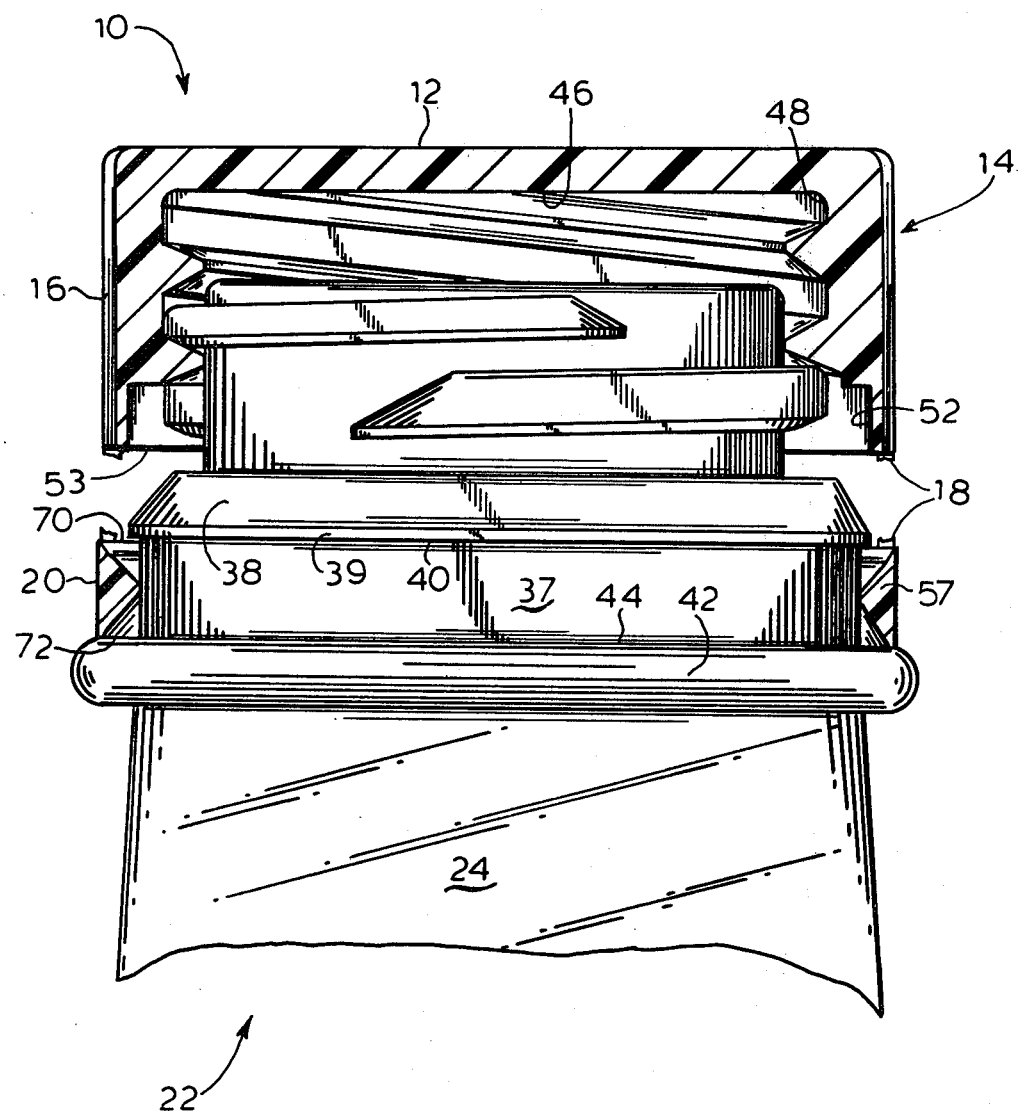
FIG. 4 is a sectional view of the closure partially removed from the neck of the container with the breakaway skirt remaining on the container.

An attempted removal of the closure will cause a breaking at the straps 18 due to the engagement of the breakaway skirt 20 with the bottom surface 40 of the ring 36, as shown in FIG. 4. The breakaway portion 20 will remain on the bottle, between rings 36 and 42 within the tight tolerances shown. This inhibits removal of the breakaway portion 20 due to its difficulty of removal so as to discourage reuse of the bottle. While this portion remains on the bottle, it provides an indication to the consumer that the bottle has been opened.

Note that after the breakaway skirt has been broken off, the closure can still be used to seal the bottle. Note also that the wedge shaped ring 57 also facilitates its removal from the molding apparatus, particularly the core, due to surface 54 which allows it to be eased off.

Since the straps are relatively short, the space between the side wall 14 and the breakaway skirt 20 is slight (approximately 0.005" giving), the closure has a clean, elegant look.

As is readily apparent, the objects and advantages of the invention are realized and while a detailed description of the preferred embodiment has been set forth herein, it should not be restricted thereby, rather its scope should be determined by that of the appended claims.

What is claimed is:

1. A tamper proof closure for a container with a neck finish having a threaded portion and a retaining means therebelow having a bottom surface, said closure comprising:
   a body having a substantially straight side wall having an inner surface with an internally threaded portion located on said inner surface and on its external surface having located thereon a plurality of spaced ribs;
   a breakaway skirt therebelow;
   a frangible connecting means for connecting said breakaway to said side wall including a plurality of straps formed from a select number of ribs by an undercut in the side wall which extends outward from said inner surface;
   said breakaway skirt being adapted to slide over said retaining means as the closure is threaded onto the container and to be disposed below of and adjacent to said retaining means when said closure is fully threaded onto the container;
   whereby when the closure is unthreaded from the container, the breakaway skirt will be severed from the body at the frangible connecting means by the bottom surface of said retaining means acting on the breakaway skirt leaving said breakaway skirt on the container as an indication of tampering.

2. The closure in accordance with claim 1, wherein said breakaway skirt comprises an inner ring which is wedge shaped and having upper and lower surfaces forming adjacent sides of the wedge.

3. The closure in accordance with claim 2, wherein the straps are affixed to said upper surface.

4. The closure in accordance with claim 3, wherein the side wall terminates in a lower end, and wherein said straps are connected to said lower end.

5. The invention in accordance with claim 4 which includes a container and said retaining means includes an upper surface which angles downwardly with respect to the center axis of the container and away from said container terminating at the bottom surface facilitating the sliding of the breakaway skirt thereover.

6. The combination in accordance with claim 5, wherein the upper and lower surfaces of the ring angle toward each other at an angle which facilitates the placement of the closure on the container and its removal from its molding apparatus.

7. The combination in accordance with claims 5 or 6, wherein said container has a neck ring located below said retaining means with the breakaway skirt located between said neck ring and retaining means when the closure is fully threaded onto the container.

8. The combination in accordance with claim 7, wherein the neck and retaining means are formed so as to inhibit removal of the breakaway skirt from the container when said skirt is located between the neck ring and retaining means.

9. The closure in accordance with claim 1, wherein said closure is made of a single piece of plastic material such as polypropylene and is of integral construction.

10. The closure in accordance with claim 1, wherein said closure is linerless and includes a dome from which said side wall extends.

11. A tamper proof closure for a container with a neck finish having a threaded portion and a retaining means therebelow having a bottom surface, said closure comprising:
   a body having a substantially straight side wall having an inner surface with an internally threaded portion located on said inner surface;
   a breakaway skirt therebelow which comprises an inner ring which is wedge shaped having an upper and lower surface forming adjacent sides of the ring;
   a frangible connecting means for connecting said breakaway skirt to said side wall which is formed by an undercut from the inner surface of the side wall outward;
   said breakaway skirt being adapted to slide over said retaining means as the closure is threaded onto the container and to be disposed below of and adjacent to said retaining means when said closure is fully threaded onto the container; and
   whereby when the closure is unthreaded from the container, the breakaway skirt will be severed from the body at the frangible connecting means by the bottom surface of said retaining means acting on the breakaway skirt leaving said breakaway skirt on the container as an indication of tampering.

12. The closure in accordance with claim 11 wherein said side wall has on its outer surface a plurality of spaced ribs and the frangible connecting means comprises a plurality of straps formed from a select number of ribs.

13. The closure in accordance with claim 12 wherein the straps are affixed to said upper surface.

14. The closure in accordance with claim 13 wherein the side wall terminates in a lower end and said straps are connected to said lower end.

15. The invention in accordance with claim 14 which includes a container and said retaining means includes an upper surface which angles downwardly with respect to the center axis of the container and away from said container terminating at the bottom surface facilitating the sliding of the breakaway skirt thereover.

16. The combination in accordance with claim 15 wherein the upper and lower surfaces of the ring angle toward each other at an angle which facilitates the placement of the closure on the container and its removal from its molding apparatus.

17. The combination in accordance with claims 15 or 16 wherein said container has a neck ring located below said retaining means with the breakaway skirt located between said neck ring and retaining means when the closure is fully threaded onto the container.

18. The combination in accordance with claim 17 wherein the neck retaining means are formed so as to inhibit removal of the breakaway skirt from the container when said skirt is located between the neck ring and retaining means.

19. The closure in accordance with claim 11 wherein said closure is made of a single piece of plastic material such as polypropylene and is of integral construction.

20. The closure in accordance with claim 11 wherein said closure is linerless and includes a dome from which said side wall extends.

21. A tamper proof closure for a container having a neck with a threaded portion and retaining means therebelow with said threaded portion including threads having a maximum thread diameter, said closure comprising:
   a one-piece closure body including a crown with a downwardly depending cylindrical side wall;
   said cylindrical side wall being substantially straight and having an inner surface with an internally-threaded upper portion and a depending lower skirt portion;

said internally threaded upper portion having threads which project inwardly from the inner surface of said cylindrical side wall, said depending lower skirt portion including an inwardly projecting ring adapted to engage said retaining means of said container when said closure is completely threaded onto said container, said inwardly projecting ring projecting inwardly to a point substantially no further than a plane corresponding to said inner surface of said cylindrical side wall so that said closure can be applied to said container substantially without interference from said maximum thread diameter of said threaded portion on said neck so that said closure can be applied to said container without breaking prematurely; and said cylindrical side wall including a frangible portion comprising an area of weakness designed to fracture in a substantially horizontal plane across said closure at a predetermined location positioned so as to separate the lower skirt portion from the side wall when said closure is unthreaded from said container by way of the engagement of the internal ring with the retaining ring thereby leaving said depending lower skirt portion on said container after said internally threaded upper portion of said closure has been unthreaded from said container.

* * * * *